March 3, 1931. W. E. URSCHEL 1,794,743
BEAN CUTTER
Filed April 15, 1926 4 Sheets-Sheet 1
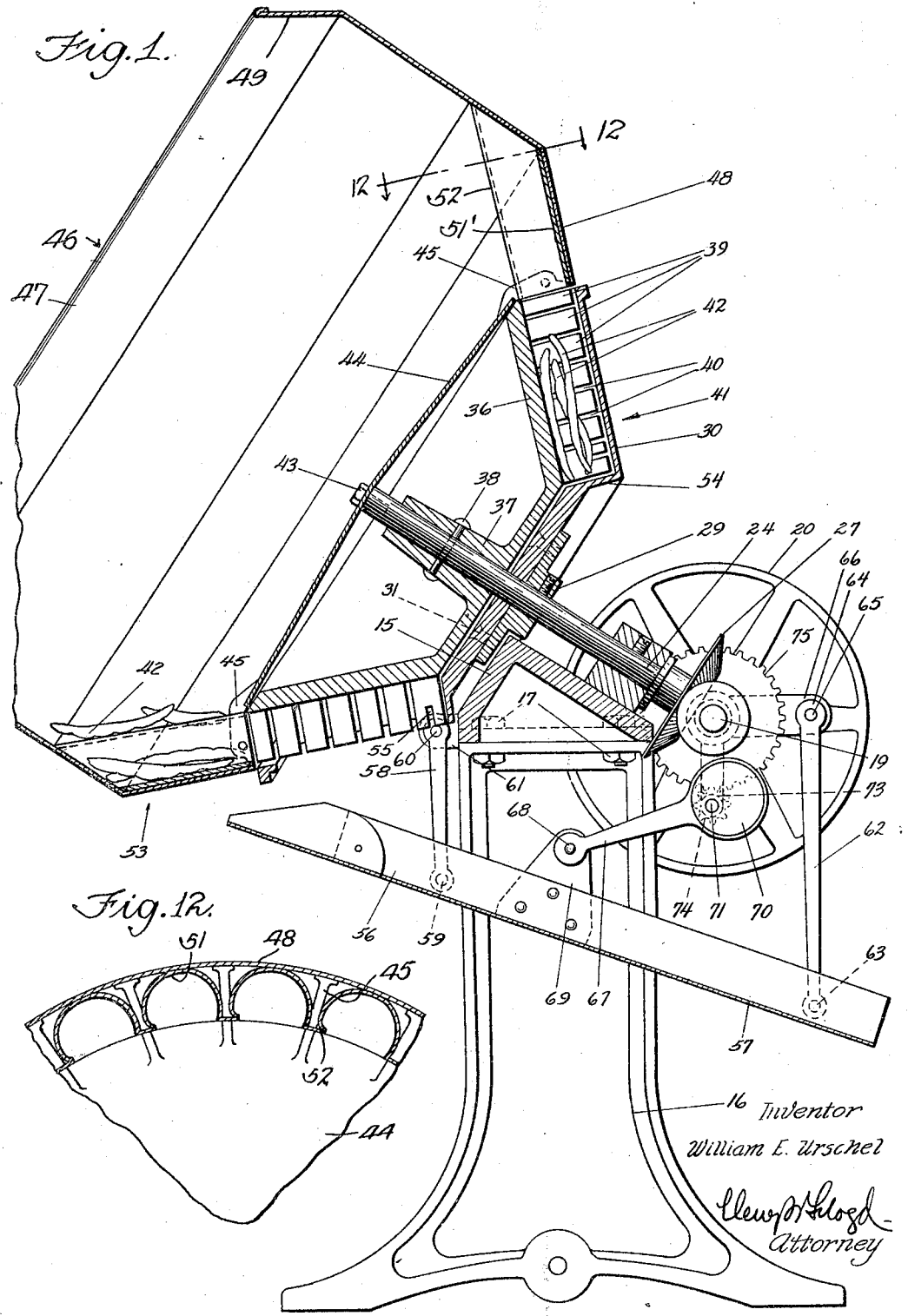

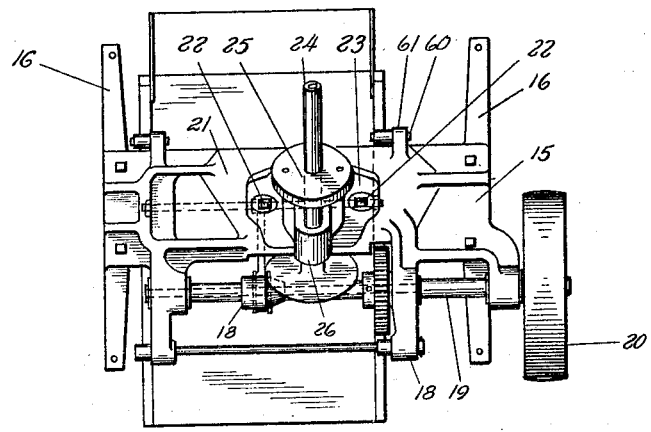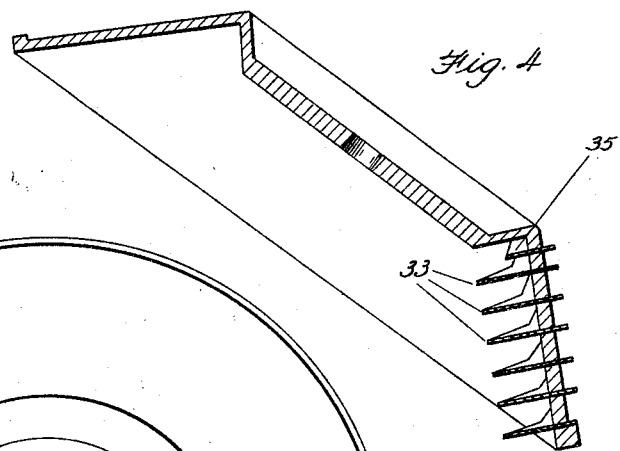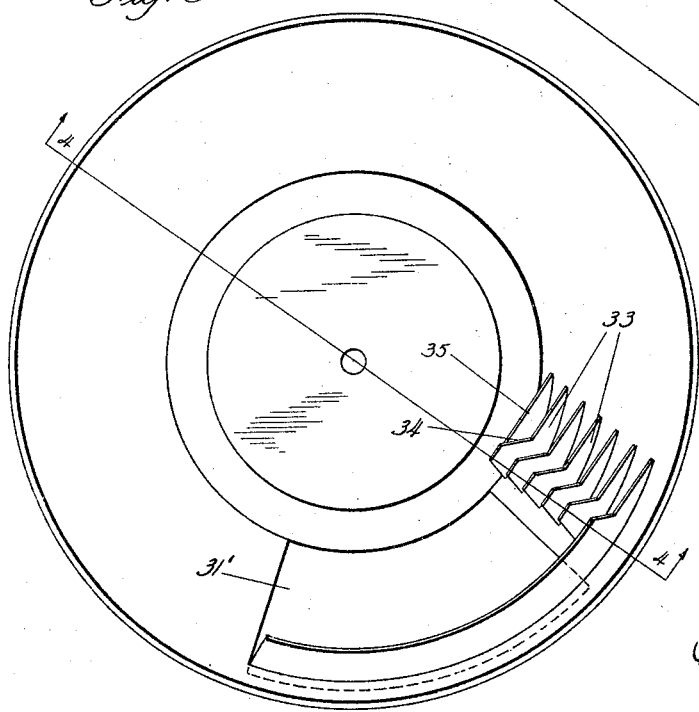

March 3, 1931.  W. E. URSCHEL  1,794,743
BEAN CUTTER
Filed April 15, 1926   4 Sheets-Sheet 3
Fig. 5
Fig. 6
Fig. 7
Fig. 8
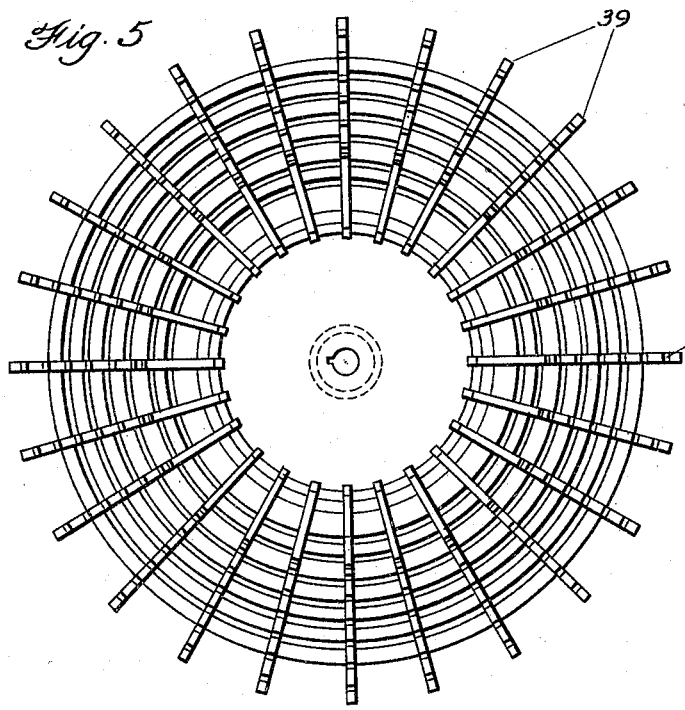
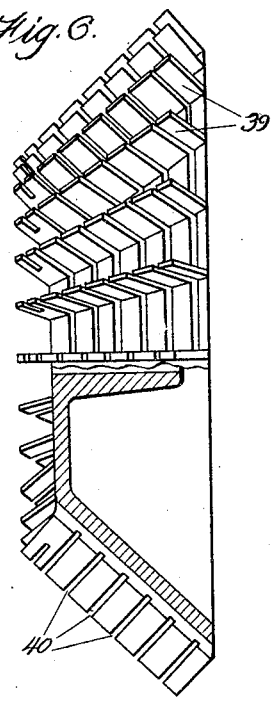
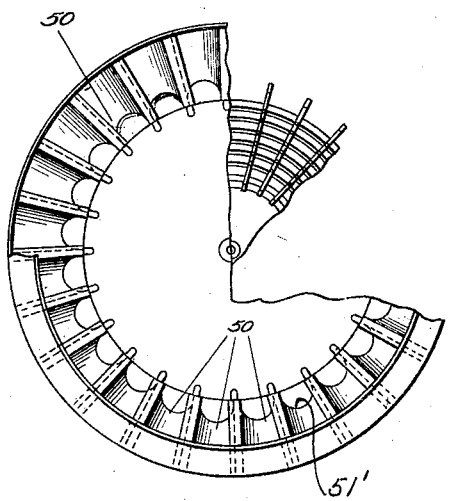
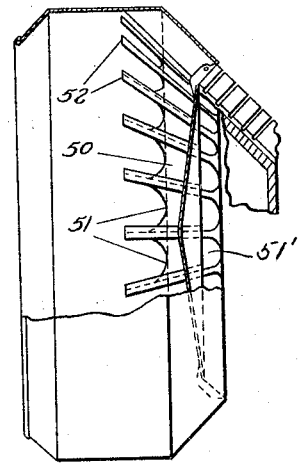
Inventor
William E. Urschel
Attorney March 3, 1931.  W. E. URSCHEL  1,794,743
BEAN CUTTER
Filed April 15, 1926  4 Sheets-Sheet 4

Inventor
William E. Urschel
Attorney

Patented Mar. 3, 1931

1,794,743

UNITED STATES PATENT OFFICE

WILLIAM E. URSCHEL, OF VALPARAISO, INDIANA

BEAN CUTTER

Application filed April 15, 1926. Serial No. 102,114.

This invention relates to a bean cutter and more particularly to a machine for cutting green bean pods into pieces preparatory to canning. One of the objects of the present invention is to provide a simple and efficient bean pod cutting machine which cuts the bean pods in uniform lengths and gauges the lengths of the pieces in which the pods are cut from one end thereof.

A still further object of the invention is to provide an improved and novel feeding mechanism in connection with my bean cutting machine which will gather the bean pods in such a manner that they will be fed or presented to the cutting mechanism so that the cutting mechanism will cut the bean pods in lines transverse to their longitudinal lengths.

A still further object of the invention is to provide means in connection with my bean cutting mechanism whereby the lengths of the cut pieces may be adjusted, or said pieces lengthened from the conventional length piece, and in this connection I have provided an additional means whereby the short ends cut from the lengthened pieces may be separated or segregated from the longer pieces.

A still further object of the invention is to provide an improved shaker mechanism which will cooperate with my improved bean cutting mechanism in such a manner that the smaller particles discharged with the cut pieces of bean pods together with any individual beans will be separated from the cut pieces.

These, and other objects, are accomplished by providing a construction and arrangement of the various parts in the manner hereinafter described and particularly pointed out in the appended claims.

Referring to the drawings:—

Figure 1 is a side elevational view of my improved bean cutting machine with certain parts shown in cross section.

Figure 2 is a top plan view of the machine shown in Figure 1 with the hopper and its associated parts removed therefrom.

Figure 3 is a top plan view showing the construction of my outside or knife supporting bowl.

Figure 4 is a cross sectional view taken on the lines 4—4 in Figure 3 and looking in the direction the arrows indicate.

Figure 5 is a bottom plan view of the inside bowl showing the construction of the partitions or ribs which go to make up the walls for the pockets by means of which the bean pods are conveyed to the cutting mechanism.

Figure 6 is a side elevational view partly in cross section showing the construction of the bowl illustrated in Figure 5.

Figure 7 is a fragmentary top plan view showing the construction of the hopper.

Figure 8 is a side elevational view partly in cross section of the hopper shown in Figure 7.

Figure 12 is a cross-section view taken on lines 12—12 of Figure 1 and looking in the direction of the arrows.

Figure 9:
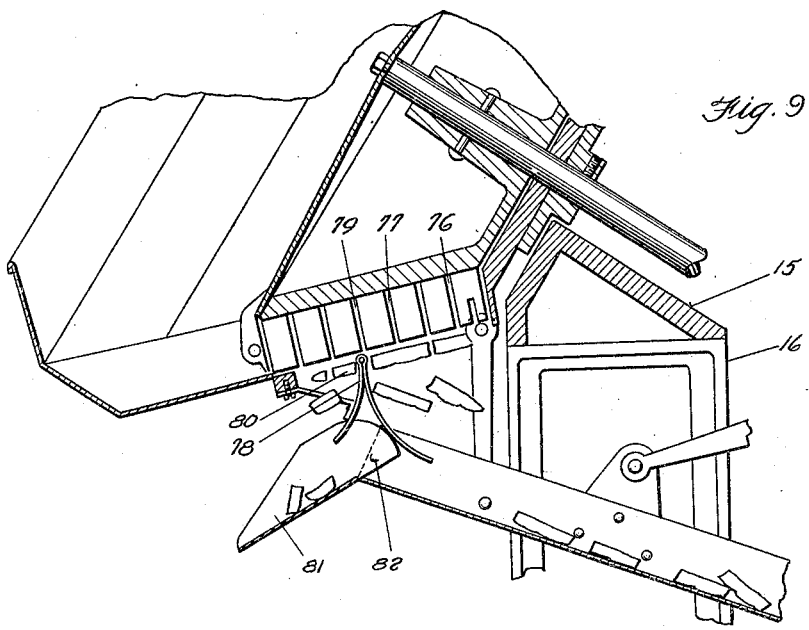
Figure 9 is a fragmentary side elevational view partly in cross section showing the manner in which certain knives may be removed for enlarging the lengths of pods being cut by my cutting mechanism and also showing my improved means for separating the smaller parts of the cut pod from the longer lengths.
Figure 10:
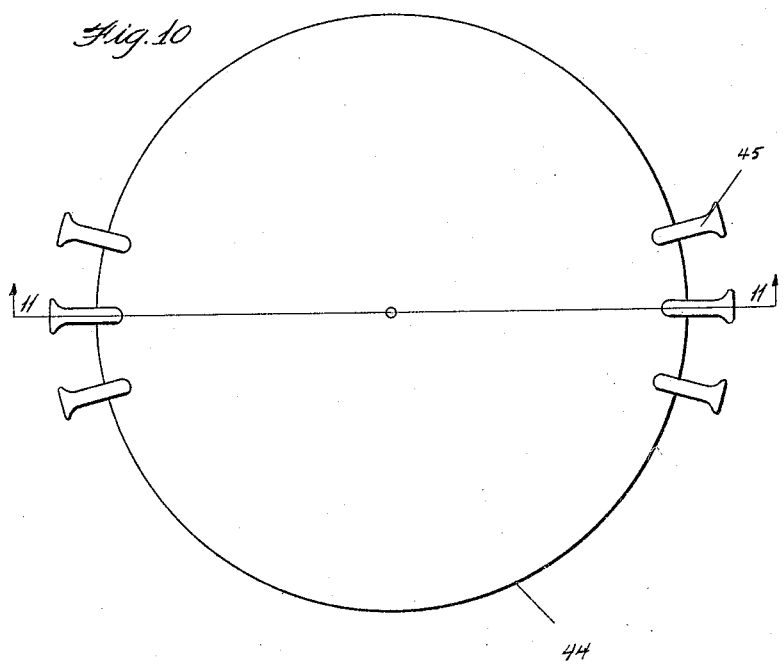
Figure 10 is a top plan view of the hopper plate.
Figure 11:
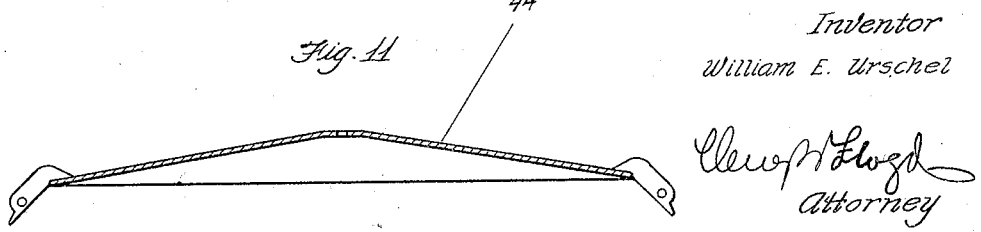
Figure 11 is a cross sectional view of the hopper plate shown in Figure 10.

In carrying out my invention I have shown the same as comprising a main frame member 15 which is mounted on oppositely disposed legs or stands 16. The legs 16 are secured to the main frame member 15 by means of bolts 17.

Formed integrally with the main frame member 15 are rearwardly extending arms 18 which form bearings for a main shaft 19.

Mounted on one end of the main shaft and keyed thereto is a driven pulley 20 by means of which the power is transmitted to my bean cutting machine.

Secured to the main frame member 15 and preferably on ears 21 by means of bolts 22 is a bowl supporting bracket 23. The bearing bracket 23 is disposed at an angle with respect to the main frame member 15 so as to support therein a bowl shaft 24.

The bowl shaft 24 is disposed at an angle of slightly less than 45 degrees with respect to the horizontal and is supported in the upper and lower bearing portions 25 and 26 respectively formed in the bowl brackets 23. The shaft 24 has secured at its lower end a beveled gear 27 which in turn is in meshing relation with a pinion 28 keyed to the main shaft 19.

The bowl bracket 23 is provided adjacent its upper end with a supporting disk portion 29. Secured to the supporting disks 29 of the bowl bracket 23 is a stationary or knife supporting bowl 30. The stationary or knife supporting bowl 30 is secured to the disk 29 by means of countersunk bolts 31.

The stationary or knife supporting bowl 30 is in the form of an inverted flat frustum of a cone or in the shape of a dish with the bottom raised. The bowl 30 has a section of its inclined side cut away as shown at 31' and forms an opening for permitting the pieces of bean pods after being cut to drop therethrough. This cut away portion is slightly less than one-fourth of the disk or bowl 30.

Adjacent one edge of the cut away portion and extending concentrically with respect to the longitudinal axis of the bowl 30 are a plurality of knives or cutters 33. These knives are arranged or spaced apart equal distances adjacent the cut away portion and the distances between them represent the lengths of the pieces into which the bean pods are cut. The cutting edges of the knives 33 are beveled as shown at 34. As the bean pods approach the knives 33 as they are being revolved in a clockwise direction, the knives 33 will have a draw cut effect on the bean pods and render the severing of the pods a simple and easily accomplished operation. Inside the innermost knife 33 and lying in close proximity thereto is a compressor member 35 which compresses the bean pods together in a manner hereinafter described to more effectively hold the bean pods while they are being cut into uniform pieces.

Mounted concentrically with and rotatable with respect to the outer knife holder bowl 30 is an inner or rotatable bowl 36. Formed integrally with the inner bowl 36 is a hub 37 which is secured by means of a pin 38 to the shaft 24. The bowl 36 is in the shape of an inverted frustum of a cone and has its conically shaped wall provided with a plurality of ribs 39. These ribs are spaced apart and occupy different planes passing through the longitudinal axis of the bowl. Ribs 39 are slotted as shown at 40 so as to permit the inner or revolving bowl 36 to freely pass by the spaced apart cutters or knives 33.

The conically shaped wall of the bowl 36 and the ribs 39 together with the conically shaped wall of the outside bowl 30 forms a plurality of pockets 41 in which the bean pods 42 are collected, supported, and conveyed to the cutting knives with their longitudinal dimension extending longitudinally of the pockets.

Secured to the upper end of the shaft 24 by means of a bolt 43 which is in threaded engagement with a threaded aperture in the end of the shaft 24 is a plate or disk 44. Formed integrally with the plate or secured thereto in any well known manner and in spaced apart relation about the periphery thereof are a plurality of lateral projections 45.

Mounted on the inner rotatable bowl 36 is a hopper 46. The hopper 46 is in the form of a cylindrical drum 47 having a conically shaped lower portion 48 and an upper conically shaped portion 49 formed integrally therewith. Mounted in the hopper 46 and secured thereto in any well known manner is an inclined partition 50 which is shaped to form trough-like outer pockets 51 having upwardly and outwardly extending legs 52. Outer pockets 51' are closed at the upper end by hopper 46, lines 51 being the juncture of the hopper 46 and pockets 51'. The lower or inner end of pockets 51' is open and which has portions cut away at regular intervals as shown at 51 so as to form upwardly and outwardly extending legs 52. Each cut away portion 51 forms an entrance to the upper pockets 51', formed between this partition wall 50 and the inclined conically shaped wall 48 of the hopper. These cut away portions 51 as well as the upper pockets 51', register with the pockets 40 formed between the ribs 39 and the inner and outer tapered walls of the inner and outer bowls 36 and 30 respectively. The lower end of the partition member 50 is secured at regular intervals to the projections 45 formed on the plate 44 by means of which the hopper is supported for rotation with the inner bowl 36.

By reference to Figure 1 of the drawing it will be noted that by reason of the shape of the revolving hopper and the angular position in which it is mounted on the shaft 24 that the pods shown at 53 normally occupy a prostrate position in the lower portion of the hopper by reason of the horizontal position of the conical portion 48 of the hopper and that when the pods reach their uppermost position the conically shaped portion 48 of the hopper assumes substantially a vertical position.

In the operation of the mechanism thus far described, the bean pods are emptied into the open side of the hopper which is adjacent the conical portion 49 of the hopper, and the hopper is then revolved by the power mechanism in a clockwise direction. The beans that lay in a position lengthwise with the pockets at the bottom of the hopper drop or slide into the outer pockets 51' formed by the partition member 50, in a lengthwise direction. While the pockets 51' formed by the partition 50 occupy a position during the cycle of operation within sixty degrees on either side of the vertical on the lower side of the hopper, the legs 52 forming the division between the pockets cause the beans to adjust themselves or roll into the pockets. In other words, this revolving motion of the pocket through the lowermost 120 degrees of the cycle of operation causes the bean pods to take a position so that their longitudinal lengths lie longitudinally of the pockets or in a position so that they will fall readily into the outer pockets.

While the pockets 51' are in positions beginning from the fourth quadrant of the cycle of movement of the hopper and ending with the first thirty degrees of the first quadrant of the cycle of operation, the bean pods will slide from the outer pockets 51' into the inner pockets 40 formed by the tapered walls of both the inner and outer bowls and the ribs 39. When the bean pods reach the inner pockets 40, they extend longitudinally of the pockets and have one of their ends resting against the bottom 54 of the outer bowl 30 as clearly shown in Figure 1.

The beans are conveyed and supported in this position until they approach the cutter knives 33 and just prior to reaching the cutting edges 34 of the knives 33, a compressor member 35 which is adapted to travel in a slot 55 formed on the inside of the ribs 39 compresses the bean pods against the inclined or conical surface of the inner bowl 36, and they are held in this position while the cutting edges 34 of the knives sever the bean pods in pieces. After the cut pods have passed the knives they are dropped through the opening of the cut away portion 31 in the conical wall of the outer bowl 30 from where they are dropped on a reciprocating shaker 56 which is provided with a screened bottom 57. The shaker 56 is pivotally supported to the frame of the machine by forward links 58 which have their lower ends pivoted, as shown in 59, to the shaker, and their upper ends pivoted to stub shafts 60 which in turn are secured to bearing ears 61 formed integrally with the main frame member 15.

The other end of the shaker is pivotally supported in inclined position by a second pair of links 62 which have their lower end as shown at 63 pivoted to the shaker and their upper ends as shown at 64 pivoted on a shaft 65 mounted in the bearing portion 66 formed on the rearwardly extending arms 18 of the main frame 15. The shaker 56 is operably driven by a connecting rod 67 which has one end pivotally connected as shown at 68 to a bracket 69 secured to the side of the shaker.

The other end of the connecting rod 67 is operably connected to an eccentric 70 which is mounted on a shaft 71 which in turn is mounted on suitable bearings 73 formed integrally with the main frame member 15. The shaft 71 is operably driven by a pinion 74 secured to the shaft 71 and which is in meshing relation with a gear 75 secured to the main shaft 19.

When it is desired to cut the bean pods in relatively longer lengths than by the mechanism just described the first and third inner knives may be removed or the knives as indicated as passing through the slots 76 and 77 (see Figure 9). In this connection I provide an additional means whereby the short ends cut from the pod may be separated or segregated from the relatively longer pieces acquired by removing certain of the knives.

This is done by positioning a pivoted V-shaped member 78 adjacent one of the slots 79 through which the fourth knife from the center travels so that the short pieces as shown at 80 may drop on the forward side of the divisional V-shaped member 78 and the relatively longer pieces drop on the rear side of the divisional V-shaped member 78 into the reciprocating shaker 56.

In order to further facilitate this operation I provide a pivoted extension as shown at 81 which is pivoted to the shaker as shown at 82 and may be adjusted to the inclined position shown in Figure 9 to assist in separation of the short ends of the pod with respect to the relatively longer cut pieces.

It will be noted that in the operation of the above described bean cutter machine that as the bean pods drop into the pockets 40 that one end of the bean pods strikes the inclined bottom portion 54 of the stationary disk 30. This inclined side 54 forms the bottoms for each of the pockets and serves to gauge the lengths into which the bean pods are cut from the end of the bean pods, thereby insuring uniform lengths measured or gauged from one end of the bean pods.

It will of course be understood that a suitable receptacle may be provided for receiving the cut pods at the discharge end of the shaker.

While in the above specification I have described one embodiment which my invention may assume in practice it will of course be understood that the same is capable of modifications and that modifications may be employed without departing from the spirit and scope of my invention as expressed in the following claims.

What I claim as my invention and desire to secure by Letters Patent is:

1. In a machine of the class described comprising a main frame, a rotatable shaft mounted on said main frame, a stationary bowl mounted on said main frame, knives carried by said stationary bowl, a rotating bowl secured to said main shaft and rotatable within said stationary bowl, and pockets formed adjacent the periphery of said rotatable bowl whereby bean pods carried in said pockets are severed into pieces by the knives on said stationary bowl.

2. In a machine of the class described comprising a main frame, a shaft journalled in said main frame, a stationary bowl secured to said main frame and positioned coaxially with said shaft, a plurality of spaced apart knives secured to said stationary bowl, said stationary bowl having cut away portion adjacent said knives, a rotatable bowl secured to said shaft and rotatable within said stationary bowl, a plurality of pockets spaced about the periphery of said rotatable bowl and adapted to receive bean pods therein, and a hopper secured to said rotatable bowl and adapted to cooperate with said rotatable bowl for feeding bean pods into the pockets formed on the periphery of said rotatable bowl whereby the bean pods are conveyed within said pockets to the cutting knives and severed into uniform pieces.

3. A bean pod cutting machine comprising a frame, a shaft mounted on said frame, a stationary bowl mounted coaxially with said shaft, a plurality of spaced apart knives carried by said stationary bowl, a rotatable bowl secured to said shaft and adapted to rotate concentrically within said stationary bowl, a plurality of pockets arranged about the periphery of said rotatable bowl for receiving and conveying bean pods to be severed by said knives, and means for gauging the lengths into which said bean pods are severed from one end of said bean pods.

4. A bean pod cutting machine comprising a frame, a shaft mounted on said frame, a stationary bowl mounted coaxially with said shaft, a plurality of spaced apart knives carried by said stationary bowl, a rotatable bowl secured to said shaft and adapted to rotate concentrically within said stationary bowl, a plurality of pockets arranged about the periphery of said rotatable bowl for receiving and conveying bean pods to be severed by said knives, and means forming a part of said stationary bowl for gauging the lengths into which said bean pods are severed from one end of said bean pods.

5. A bean pod cutting machine comprising a frame, a shaft mounted on said frame, a stationary bowl mounted coaxially with said shaft, a plurality of spaced apart knives carried by said stationary bowl, a rotatable bowl secured to said shaft and adapted to rotate concentrically within said stationary bowl, a plurality of pockets arranged about the periphery of said rotatable bowl for receiving and conveying bean pods to be severed by said knives, and means formed in the bottom of said stationary bowl whereby the lengths of the pieces into which said bean pods are severed are gauged from one end of said bean pods.

6. A bean cutting machine comprising a frame, a rotatable shaft mounted on said frame, a stationary bowl secured to said frame and positioned coaxially with said shaft, a plurality of spaced apart knives secured at one side of said bowl, a rotatable bowl secured to said shaft, a plurality of pockets arranged about the periphery of said rotatable bowl for receiving and conveying bean pods to be severed by said knives, and a cylindrical hopper secured to and rotatable with said rotatable bowl for feeding the bean pods longitudinally into said pockets.

7. A bean pod cutting machine comprising a frame, a rotatable shaft mounted on said frame, a stationary member secured to said frame and arranged concentrically with respect to said shaft, knives carried by said stationary member, and means secured to said shaft and rotatable therewith for receiving and conveying bean pods and adapted to present their longitudinal length transversely to said cutting knives.

8. A bean pod cutting machine comprising a frame, an angularly disposed rotatable shaft mounted on said frame, a stationary bowl mounted on said frame and positioned coaxially with respect to said shaft, a plurality of spaced apart knives carried by said stationary bowl, a rotatable bowl secured to said shaft and rotatable therewith, and a plurality of pockets formed between the wall of said rotatable bowl and said stationary bowl and adapted to receive and convey therein bean pods to be severed by said knives.

9. A bean pod cutting machine comprising a frame, an angularly disposed rotatable shaft mounted on said frame, a stationary bowl mounted on said frame and positioned coaxially with respect to said shaft, a plurality of spaced apart knives carried by said stationary bowl, a rotatable bowl secured to said shaft and rotatable therewith, a plurality of pockets formed between the wall of said rotatable bowl and said stationary bowl and adapted to receive and convey therein bean pods to be severed by said knives, and a cylindrical hopper secured to said rotatable bowl for feeding the bean pods into the pockets as the rotatable bowl and hopper is revolved.

10. A bean pod cutting machine comprising a frame, an angularly disposed rotatable shaft mounted on said frame, a stationary bowl secured to said frame and positioned coaxially with said shaft, spaced apart knives carried by said stationary bowl, a rotatable bowl secured to said shaft and mounted within said stationary bowl, a plurality of ribs secured to the periphery of said rotatable bowl so as to form separate pockets between the respective walls of said stationary and rotatable bowls, slots extending through said ribs whereby the knives on said stationary bowl may pass through said pockets for severing the bean pods conveyed by said pockets to said knives, and a hopper secured to said rotatable bowl and adapted to rotate therewith for feeding the bean pods into said pockets.

11. A bean pod cutting machine comprising a frame, an angularly disposed shaft mounted on said frame, a stationary bowl secured to said frame and arranged coaxially with said shaft, a plurality of spaced apart knives carried by said stationary bowl, said stationary bowl having a cut away section formed in one side thereof for permitting the pieces of bean pods to be dropped therethrough, a rotatable bowl secured to said shaft and adapted to revolve within said stationary bowl, a plurality of ribs extending outwardly from the periphery of said rotatable bowl for forming pockets between the walls of said stationary and rotatable bowls respectively, slots formed in said ribs for accommodating spaced apart knives on said stationary bowl, and a cylindrical hopper secured to said rotatable bowl and having a conically shaped wall for feeding the bean pods into the pockets formed between the walls of said rotatable and stationary bowls.

12. A bean pod cutting machine comprising a frame, a cutting mechanism mounted on said frame angularly disposed, means for gathering and conveying the bean pods and adapted to present their longitudinal lengths transversely to said cutting means, and means pivoted to said frame for conveying the cut pieces of bean pods to one side of the machine.

13. A bean pod cutting machine comprising a frame, a cutting mechanism mounted on said frame angularly disposed, means for gathering and retaining the bean pods so as to present their longitudinal lengths transversely to said cutting means, and means carried by said frame for separating certain of the pieces of the bean pods from certain other pieces.

14. A bean pod cutting machine comprising a frame, a cutting mechanism mounted on said frame, angularly disposed means for gathering and conveying the bean pods so as to present their longitudinal lengths to said cutting means, and means for retaining said bean pods in the longitudinal direction prior to effecting a severance thereof.

15. In a bean pod cutting mechanism comprising a frame, a main shaft mounted on said frame, an angularly disposed shaft mounted on said frame and geared to said main shaft, a stationary bowl mounted on said frame and arranged coaxially with said angularly disposed shaft, a plurality of spaced apart knives located at the side of said stationary bowl, said stationary bowl having a cut away portion on one side thereof, a rotatable bowl secured to said shaft and arranged concentrically with respect so said stationary bowl, a plurality of pockets formed about the periphery of said rotatable bowl for gathering and conveying bean pods to said knives, a hopper mounted on said rotatable bowl for feeding the bean pods longitudinally into said pockets, and a shaker pivotally connected to said frame and operably driven by said main shaft for conveying and sorting the cut pieces of bean pods discharged from said cutting mechanism.

16. A cutting machine comprising a stationary bowl, a plurality of spaced apart knives in fixed relation to said stationary bowl, said stationary bowl having an outlet adjacent said knives, a bowl rotatable within said stationary bowl and having a plurality of pockets adapted to receive bean pods, and a hopper secured to said rotatable bowl and cooperating with said rotatable bowl for feeding bean pods into said pockets, the bean pods within said pockets being conveyed past said knives and by them cut into pieces.

17. A bean pod cutting machine comprising a stationary bowl, a plurality of spaced apart knives, a second bowl adapted to rotate concentrically within said stationary bowl and having a plurality of pockets arranged about its periphery for receiving bean pods and conveying them past said knives, and means for gauging the lengths into which said bean pods are severed by said knives.

18. A bean pod cutting machine comprising a stationary bowl, a plurality of spaced apart knives, a second bowl adapted to rotate concentrically within said stationary bowl and having a plurality of pockets arranged about its periphery for receiving beans and conveying bean pods to be severed by said knives, and means forming a part of said stationary bowl for determining the lengths into which said bean pods are severed.

19. A bean pod cutting machine comprising a stationary bowl, a plurality of spaced apart knives upon said stationary bowl, a second bowl adapted to rotate concentrically with and within said stationary bowl and having a plurality of pockets arranged about its periphery for receiving and conveying bean pods to said knives, and means formed in the bottom of said stationary bowl whereby the lengths of the pieces into which said bean pods are severed are gauged.

20. A bean cutting machine comprising a stationary bowl, a plurality of spaced apart knives secured at one side of said bowl, a second bowl having a plurality of pockets arranged about its periphery for receiving and conveying bean pods to said knives, and a hopper secured to and rotatable with said second bowl for feeding the bean pods longitudinally into said pockets.

21. A bean pod cutting machine comprising a frame, a stationary bowl angularly mounted on said frame, a plurality of spaced apart knives carried by said stationary bowl, and a second bowl rotatable within said stationary bowl and having a plurality of pockets adapted to receive and convey bean pods to said knives to be severed.

22. A bean pod cutting machine comprising a frame, a cutting mechanism mounted on said frame, means rotatable about said cutting mechanism for conveying and retaining the bean pods so as to present their longitudinal lengths transversely to said cutting means, and means for conveying the cut pieces of bean pods to one side of the machine.

23. A bean pod cutting machine comprising a frame, a cutting mechanism mounted on said frame, means rotatable about said cutting means for conveying and retaining the bean pods so as to present their longitudinal lengths transversely to said cutting means, and means for separating certain lengths of the pieces of the bean pods from other lengths thereof.

24. The combination with a frame, of rotary means for conveying bean pods and retaining them in a parallel position radially of said means, and means for effecting the mechanical severance of said bean pods so retained transversely thereof.

25. In a rotary bean cutter having a peripheral pocket, means for crowding bean pods into a parallel group in said pocket and radially of said cutter, and cutting means adapted to transverse said pocket.

26. In a bean cutter, a movable member having pockets for arranging the beans in substantial parallelism, a means for forcing beans in said pockets against the walls thereof, and cutting edges in fixed relation to said member and past which said pockets are moved to cut the beans into sections.

WILLIAM E. URSCHEL.